(12) United States Patent
Azancot et al.

(10) Patent No.: US 8,380,998 B2
(45) Date of Patent: Feb. 19, 2013

(54) INDUCTIVE RECEIVERS FOR ELECTRICAL DEVICES

(75) Inventors: Yossi Azancot, Jerusalem (IL); Amir Ben-Shalom, Modinn (IL); Oola Greenwald, Mevasseret Zion (IL); Arik Rofe, Jerusalem (IL)

(73) Assignee: Powermat Technologies, Ltd., Neve Ilan (IL)

( * ) Notice: Subject to any disclaimer, the term of this patent is extended or adjusted under 35 U.S.C. 154(b) by 349 days.

(21) Appl. No.: 12/757,615

(22) Filed: Apr. 9, 2010

(65) Prior Publication Data

US 2010/0257382 A1    Oct. 7, 2010

Related U.S. Application Data

(63) Continuation of application No. PCT/IL2008/001348, filed on Oct. 12, 2008.

(60) Provisional application No. 60/960,635, filed on Oct. 9, 2007, provisional application No. 60/960,878, filed on Oct. 18, 2007, provisional application No. 61/006,131, filed on Dec. 26, 2007, provisional application No. 61/064,403, filed on Mar. 4, 2008.

(51) Int. Cl.
*G06F 1/26* (2006.01)

(52) U.S. Cl. ......................................... 713/300; 713/320

(58) Field of Classification Search .................. None
See application file for complete search history.

(56) References Cited

U.S. PATENT DOCUMENTS

| | | |
|---|---|---|
| 3,771,085 A | 11/1973 | Hojo et al. |
| 3,938,018 A | 2/1976 | Dahl |
| 4,160,193 A | 7/1979 | Richmond |
| 4,431,948 A | 2/1984 | Elder et al. |
| 4,754,180 A | 6/1988 | Kiedrowski |
| 4,977,515 A | 12/1990 | Rudden et al. |
| 5,221,877 A | 6/1993 | Falk |
| 5,278,771 A | 1/1994 | Nyenya |
| 5,367,242 A | 11/1994 | Hulman |
| 5,455,466 A | 10/1995 | Parks et al. |
| 5,486,394 A | 1/1996 | Stough |
| 5,528,113 A | 6/1996 | Boys et al. |
| 5,550,452 A | 8/1996 | Shirai et al. |
| 5,600,225 A | 2/1997 | Goto |
| 5,713,939 A | 2/1998 | Nedungadi et al. |
| 5,734,254 A | 3/1998 | Stephens |
| 5,762,250 A | 6/1998 | Carlton et al. |
| 5,821,728 A | 10/1998 | Schwind |
| 5,821,731 A | 10/1998 | Kuki et al. |
| 5,907,285 A | 5/1999 | Toms et al. |
| 5,929,598 A | 7/1999 | Nakama et al. |
| 5,949,214 A | 9/1999 | Broussard et al. |
| 6,042,005 A | 3/2000 | Basile et al. |
| 6,211,649 B1 * | 4/2001 | Matsuda ....................... 320/115 |
| 6,230,029 B1 | 5/2001 | Hahn et al. |
| 6,396,935 B1 | 5/2002 | Makkonen |

(Continued)

FOREIGN PATENT DOCUMENTS

| | | |
|---|---|---|
| WO | 9602879 A1 | 2/1996 |
| WO | 2010/025156 A1 | 3/2010 |

(Continued)

OTHER PUBLICATIONS

International Search Report and Written Opinion as filed in PCT/IL2008/001348, as mailed on Oct. 12, 2008.

*Primary Examiner* — Dennis M Butler
(74) *Attorney, Agent, or Firm* — Brooks Kushman P.C.

(57) ABSTRACT

A power providing system for an electrical device includes a secondary inductor, wired to the electrical device, for inductively coupling with a primary inductor hardwired to a power supply. The secondary inductor is incorporated into an accessory of the electrical device.

16 Claims, 12 Drawing Sheets

U.S. PATENT DOCUMENTS

| | | |
|---|---|---|
| 6,436,299 B1 | 8/2002 | Baarman et al. |
| 6,441,589 B1 | 8/2002 | Frerking et al. |
| 6,484,260 B1 | 11/2002 | Scott et al. |
| 6,532,298 B1 | 3/2003 | Cambier et al. |
| 6,586,909 B1 | 7/2003 | Trepka |
| 6,624,616 B1 | 9/2003 | Frerking et al. |
| 6,644,557 B1 | 11/2003 | Jacobs |
| 6,673,250 B2 | 1/2004 | Kuennen et al. |
| 6,721,540 B1 | 4/2004 | Hayakawa |
| 6,731,071 B2 | 5/2004 | Baarman |
| 6,766,040 B1 | 7/2004 | Catalano et al. |
| 6,825,620 B2 | 11/2004 | Kuennen et al. |
| 6,888,438 B2 | 5/2005 | Hui et al. |
| 6,894,457 B2 | 5/2005 | Germagian et al. |
| D519,275 S | 4/2006 | Shertzer |
| 7,043,060 B2 | 5/2006 | Quintana |
| 7,126,450 B2 | 10/2006 | Baarman et al. |
| 7,132,918 B2 | 11/2006 | Baarman et al. |
| 7,164,255 B2 | 1/2007 | Hui |
| 7,180,248 B2 | 2/2007 | Kuennen et al. |
| 7,180,265 B2 * | 2/2007 | Naskali et al. ............ 320/108 |
| 7,224,086 B2 | 5/2007 | Germagian et al. |
| 7,233,319 B2 | 6/2007 | Johnson et al. |
| D553,852 S | 10/2007 | Brandenburg |
| 7,385,357 B2 | 6/2008 | Kuennen et al. |
| 7,392,068 B2 | 6/2008 | Dayan et al. |
| 7,405,535 B2 | 7/2008 | Frerking et al. |
| 7,462,951 B1 | 12/2008 | Baarman |
| D586,809 S | 2/2009 | Jones et al. |
| 7,518,267 B2 | 4/2009 | Baarman |
| 7,522,878 B2 | 4/2009 | Baarman |
| 7,576,514 B2 | 8/2009 | Hui |
| D599,735 S | 9/2009 | Amidei et al. |
| D599,736 S | 9/2009 | Ferber et al. |
| D599,737 S | 9/2009 | Amidei et al. |
| D599,738 S | 9/2009 | Amidei et al. |
| D603,603 S | 11/2009 | Laine et al. |
| 7,612,528 B2 | 11/2009 | Baarman et al. |
| D607,879 S | 1/2010 | Ferber et al. |
| D611,407 S | 3/2010 | Webb |
| D611,408 S | 3/2010 | Ferber et al. |
| 7,906,936 B2 * | 3/2011 | Azancot et al. ............ 320/108 |
| 2002/0057584 A1 | 5/2002 | Brockmann |
| 2002/0158512 A1 | 10/2002 | Mizutani et al. |
| 2003/0210106 A1 | 11/2003 | Cheng et al. |
| 2004/0023633 A1 | 2/2004 | Gordon |
| 2004/0195767 A1 | 10/2004 | Randall |
| 2004/0203537 A1 | 10/2004 | Yoshida et al. |
| 2004/0242264 A1 | 12/2004 | Cho |
| 2004/0261802 A1 | 12/2004 | Griffin et al. |
| 2005/0007067 A1 | 1/2005 | Baarman et al. |
| 2005/0083020 A1 | 4/2005 | Baarman |
| 2005/0130593 A1 | 6/2005 | Michalak |
| 2005/0169506 A1 | 8/2005 | Fenrich et al. |
| 2005/0192062 A1 | 9/2005 | Mickle et al. |
| 2005/0233768 A1 | 10/2005 | Guo et al. |
| 2006/0028176 A1 | 2/2006 | Tang et al. |
| 2006/0043927 A1 | 3/2006 | Beart et al. |
| 2006/0052144 A1 | 3/2006 | Seil et al. |
| 2006/0061325 A1 | 3/2006 | Tang et al. |
| 2006/0071632 A1 | 4/2006 | Ghabra et al. |
| 2006/0091222 A1 | 5/2006 | Leung et al. |
| 2006/0093132 A1 | 5/2006 | Desormiere et al. |
| 2006/0202665 A1 | 9/2006 | Hsu |
| 2007/0023559 A1 | 2/2007 | Scapillato et al. |
| 2007/0057763 A1 | 3/2007 | Blattner et al. |
| 2007/0076459 A1 | 4/2007 | Limpkin |
| 2007/0136593 A1 | 6/2007 | Plavcan et al. |
| 2007/0165371 A1 | 7/2007 | Brandenburg |
| 2007/0182367 A1 | 8/2007 | Partovi |
| 2007/0279002 A1 | 12/2007 | Partovi |
| 2008/0001922 A1 | 1/2008 | Johnson et al. |
| 2008/0030985 A1 | 2/2008 | Jeon et al. |
| 2008/0049988 A1 | 2/2008 | Basile et al. |
| 2008/0079388 A1 | 4/2008 | Sarnowsky et al. |
| 2008/0132293 A1 | 6/2008 | Gundlach et al. |
| 2008/0157715 A1 | 7/2008 | Rosenboom et al. |
| 2008/0223926 A1 | 9/2008 | Miller et al. |
| 2008/0258680 A1 | 10/2008 | Frerking et al. |
| 2008/0265835 A1 | 10/2008 | Reed et al. |
| 2009/0026959 A1 | 1/2009 | Lin et al. |
| 2009/0040807 A1 | 2/2009 | Doumae et al. |
| 2009/0047768 A1 | 2/2009 | Jain |
| 2009/0047769 A1 | 2/2009 | Bhat et al. |
| 2009/0075704 A1 | 3/2009 | Wang |
| 2009/0079387 A1 | 3/2009 | Jin et al. |
| 2009/0084705 A1 | 4/2009 | Justiss |
| 2009/0097221 A1 | 4/2009 | Sayed et al. |
| 2009/0102416 A1 | 4/2009 | Burley |
| 2009/0134972 A1 | 5/2009 | Wu, Jr. et al. |
| 2009/0146608 A1 | 6/2009 | Lee |
| 2009/0153098 A1 | 6/2009 | Toya et al. |
| 2009/0153297 A1 | 6/2009 | Gardner |
| 2009/0174263 A1 | 7/2009 | Baarman et al. |
| 2009/0203355 A1 | 8/2009 | Clark |
| 2009/0212639 A1 | 8/2009 | Johnson |
| 2009/0226050 A1 | 9/2009 | Hughes |
| 2009/0243791 A1 | 10/2009 | Partin et al. |
| 2009/0251102 A1 | 10/2009 | Hui |
| 2009/0273891 A1 | 11/2009 | Peiker |
| 2009/0278494 A1 | 11/2009 | Randall |
| 2010/0039066 A1 | 2/2010 | Yuan et al. |

FOREIGN PATENT DOCUMENTS

WO  2010/025157 A1  3/2010

* cited by examiner

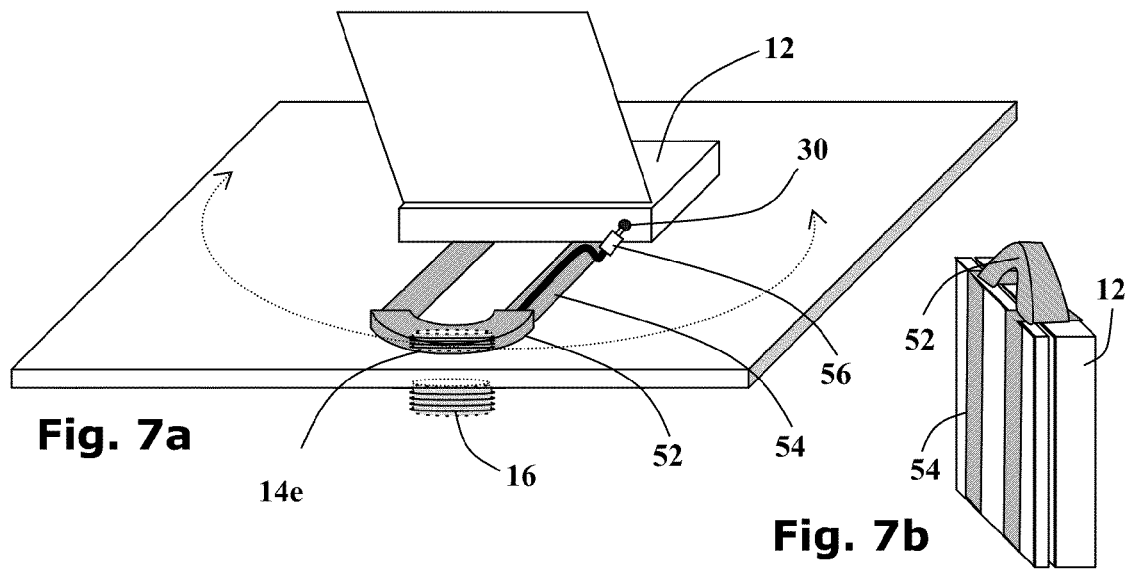
Fig. 7a
Fig. 7b
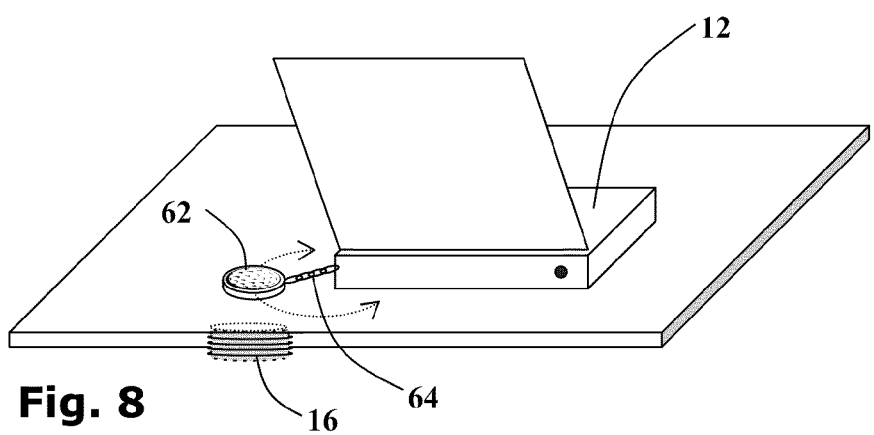
Fig. 8
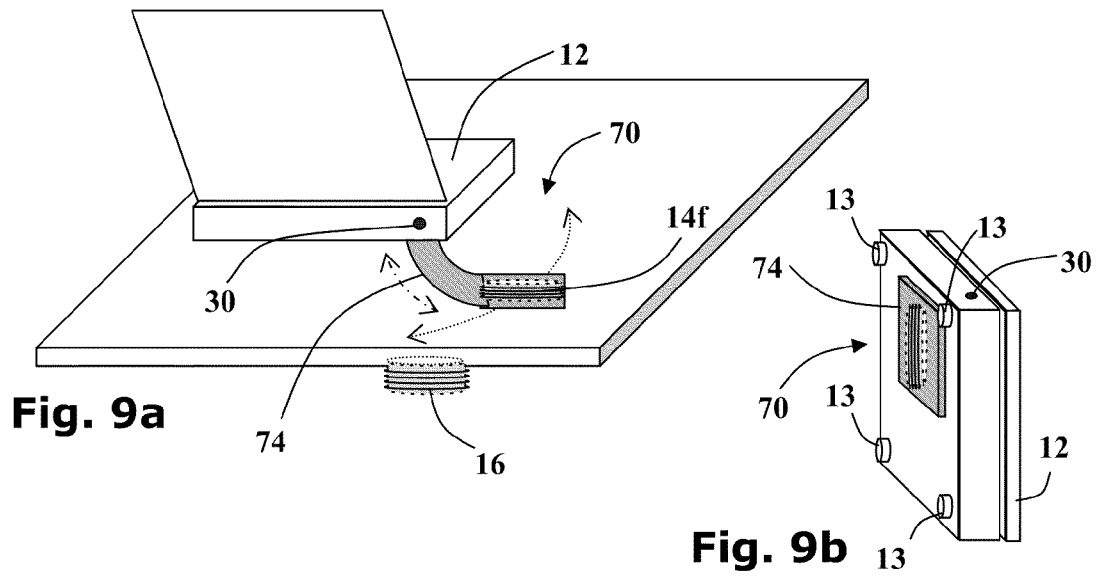
Fig. 9a
Fig. 9b

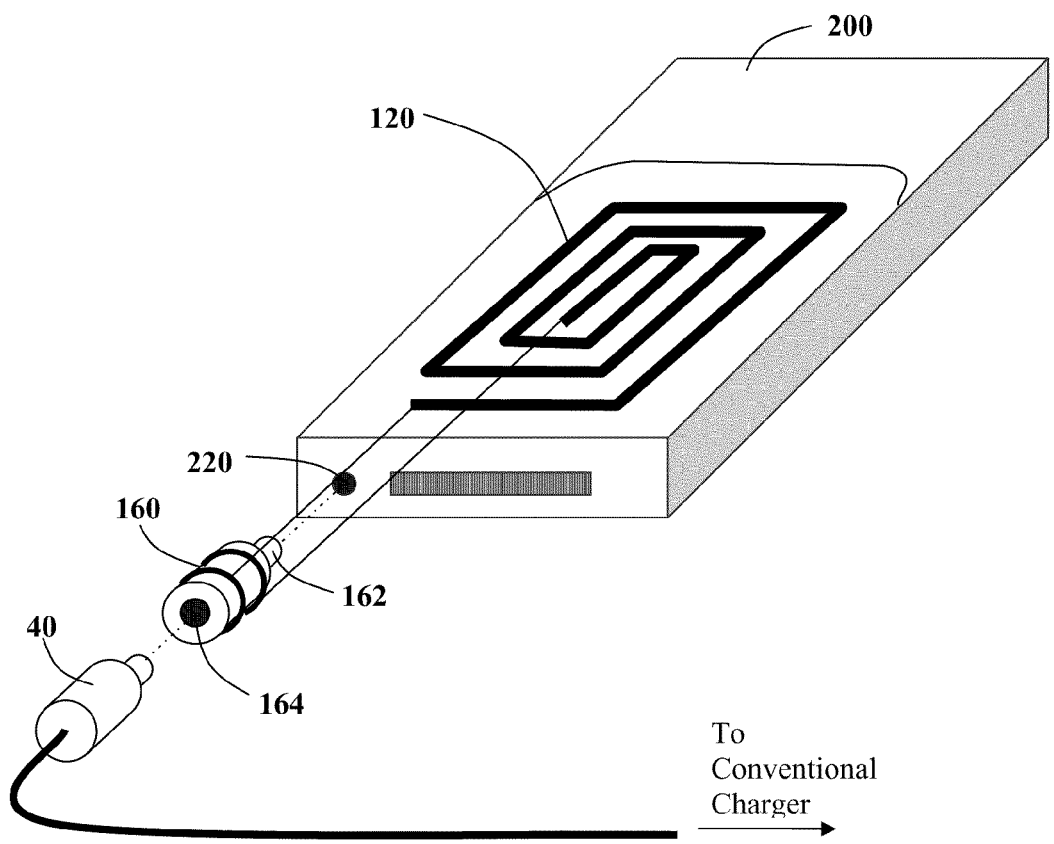
Fig. 13
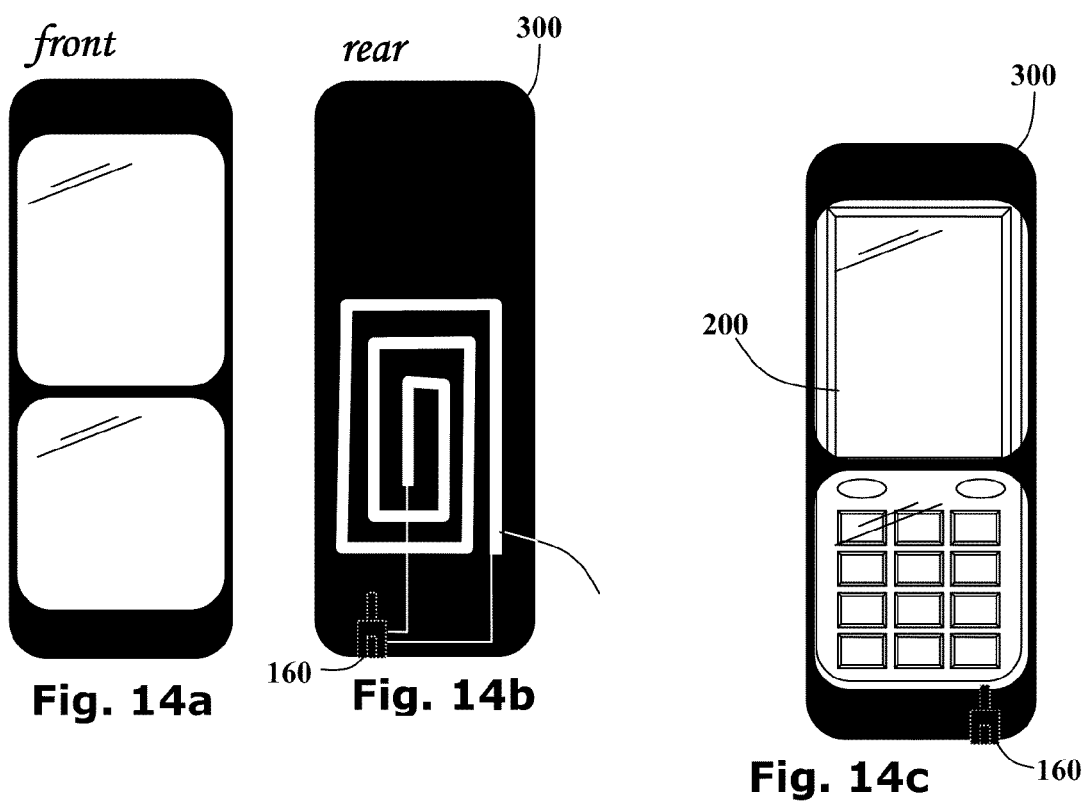
*front*    *rear*
Fig. 14a    Fig. 14b    Fig. 14c

INDUCTIVE RECEIVERS FOR ELECTRICAL DEVICES

CROSS-REFERENCE TO RELATED APPLICATION

This application is a continuation of PCT application Ser. No. PCT/IL2008/001348 filed Oct. 12, 2008, which claims the benefit of U.S. provisional application Ser. Nos. 60/960,635 filed Oct. 9, 2007; 60/960,878 filed Oct. 18, 2007; 61/006,131 filed Dec. 26, 2007 and 61/064,403 filed Mar. 4, 2008, which are hereby incorporated by reference in their entirety.

TECHNICAL FIELD

The present disclosure is directed to providing power to electrical devices using portable electrical devices adapted to receive power inductively.

BACKGROUND

Mobile communication devices, such as computers, cellular telephones and the like, are typically powered by power cells, i.e. rechargeable electrochemical cells often also referred to as batteries. In order to recharge the power cells such devices are generally provided with a charger unit for connecting to a power jack socket on the device which is wired to contacts with the terminals of the cells. The charger itself usually consists of a plug box containing a step-down transformer and an AC-DC converter or rectifier which is wired to a connecting plug. When in use, the plug box is plugged into a 120V or 240V mains socket and the connecting plug is coupled to the device. The wire trailing between the device and the plug box can be unsightly. Moreover, if the trailing wire is snagged or jerked the wire and connectors may be damaged, as indeed could be the socket or the wall. Furthermore, the device may be pulled to the ground.

Chargers are bulky items to carry around. Therefore most users of compact portable equipment such as cell phones and the like do not carry chargers with them, but prefer to rely upon periodic charging, perhaps over night. Often users rely on even more infrequent charging. As a result cells often run down at inconvenient times when no charger is available.

Inductive battery charger systems are known such as the system described in U.S. Pat. No. 7,164,255 to Hui incorporated herein by reference. In Hui's system a planar inductive battery charging system is designed to enable electronic devices to be recharged. The system includes a planar charging module having a charging surface on which a device to be recharged is placed. Within the charging module, and parallel to the charging surface, is at least one, and preferably an array of primary windings that couple energy inductively to a secondary winding within the device to be recharged. The disclosure also provides secondary modules that allow the system to be used with conventional electronic devices not formed with secondary windings.

Hui's system provides an inductive charging platform for mobile telephones. However, unless the device to be charged has an integral secondary winding coil, it may be necessary to carry a bulky secondary module with which to use the platform. Hui's system does not describe any convenient means for providing secondary windings for conventional devices.

There is therefore a need for a convenient power supply for a mobile communication device and particularly for a charger, which may be conveniently retrofitted to conventional devices.

SUMMARY

It is an aim of the disclosure to provide an inductive power providing system for an electrical device.

In accordance with a first embodiment, the present disclosure is directed to providing a power providing system for an electrical device comprising: a secondary inductor, wired to the electrical device, for inductively coupling with a primary inductor hardwired to a power supply, wherein the secondary inductor is incorporated into an accessory of the electrical device.

In various embodiments the electrical device may be selected from the group comprising: computers, mobile telephones, media players, PDAs, Walkman®s, portable CD players, dictaphones, portable DVD players and mobile communications devices. The accessory may be selected from the group comprising: removable casings of the electrical device, carrying cases for transporting the electrical device, straps for carrying the electrical device, carrying handles, fashion-tags, ornamental pendants, mobile danglers, skins for encasing the electrical device, stickers for adhering to the electrical device, belt-clips, neck support straps and earphone units.

Optionally, the secondary inductor comprises an electrical connector for coupling to a power jack socket such that the secondary inductor is retrofittable to the electrical device. In one embodiment, the electrical connector comprises a male plug portion, for coupling with the power jack socket and a female socket portion for coupling to an external power source.

In some embodiments the electrical device comprises a removable power pack; the power pack being connectable to the electrical device via contacts, the secondary inductor comprising an electrical connector for coupling to the contacts. The electrical device may further comprise an electrochemical cell, and the secondary inductor may be connected to the electrochemical cell via a rectifier for charging the electrochemical cell.

Optionally, the accessory comprises a USB plug for coupling to a computer such that the electrochemical cell is selectably chargeable by power drawn from the computer. Typically, the USB plug is wired to a data jack socket of the electrical device such that data is exchangeable between the computer and the mobile communication device.

In various embodiments, the power providing system further comprises an audio device having an external earphone unit, wherein the secondary inductor is incorporated into the earphone unit. Typically, the external earphone unit, comprises at least one inductive element for inductively coupling the primary inductor to the secondary inductor. Optionally, the inductive element comprising the secondary inductor. The secondary inductor may comprise a voice coil of at least one speaker of the earphone unit. Alternatively, the secondary inductor comprises at least one loop of wire. The loop of wire may be incorporated into a neck support strap for supporting the audio device. Alternatively, the ends of at least one wire are connected together to produce the at least one loop of wire. In other embodiments of the disclosure the earphone unit includes an inductive element which comprises a ferromagnetic core extending through the secondary inductor and into the earphone unit for selectively coupling with the primary inductor.

In still another embodiment of the disclosure, the power providing system comprises at least one inductive coil, the inductive coil being selectively connectable to: at least one charging circuit for connecting the inductive coil to a power pack via a rectifier for charging the power pack when the secondary inductor is inductively coupled to the primary inductor; and at least one driving circuit connectable to the power pack for providing a varying electrical potential to the inductive coil such that the inductive coil transfers power to an external inductor wired to an external electrical load. In various embodiments, the power pack is selected from the group comprising: nickel-cadmium cells, nickel metal hydride cells, alkaline cells, flow batteries, rechargeable electrochemical cells and capacitors. Optionally, the power providing system comprising a ferromagnetic core for guiding magnetic flux through the inductive coil when inductively coupled. Typically, the driver comprises at least one switching unit for intermittently connecting the power pack to the inductive coil at high frequency.

Optionally, the power providing system additionally comprises a jack for conductively connecting the power pack to an external power source for charging purposes. The power providing system may additionally comprise a jack for conductively connecting the power pack to the external electrical load.

It is a further aim of the disclosure to provide a computer comprising an inductive coil which is selectively connectable to: at least one charging circuit for connecting the inductive coil to a power pack via a rectifier for charging the power pack when the secondary inductor is inductively coupled to the primary inductor; and at least one driving circuit connectable to the power pack for providing a varying electrical potential to the inductive coil such that the inductive coil transfers power to an external inductor wired to an external electrical load. In one embodiment, the power pack is configured to power the computer.

It is a further aim of the disclosure to provide an inductive charger comprising at least one inductive coil and at least one chargeable power pack, the charger additionally comprising: at least one charging circuit for connecting the inductive coil to the power pack when the inductive coil is inductively coupled to a primary coil wired to a power supply for charging the power pack; and at least one driving circuit connectable to the power pack for providing a varying electrical potential to the inductive coil such that the inductive coil is inductively couplable to a secondary coil wired to an electrical load.

BRIEF DESCRIPTION OF THE FIGURES

For a better understanding of the disclosure and to show how it may be carried into effect, reference will now be made, purely by way of example, to the accompanying drawings.

With specific reference now to the drawings in detail, it is stressed that the particulars shown are by way of example and for purposes of illustrative discussion of the various embodiments of the present disclosure only, and are presented in the cause of providing what is believed to be the most useful and readily understood description of the principles and conceptual aspects of the disclosure. In this regard, no attempt is made to show structural details of the disclosure in more detail than is necessary for a fundamental understanding of the disclosure; the description taken with the drawings making apparent to those skilled in the art how the several forms of the disclosure may be embodied in practice. In the accompanying drawings:

FIGS. 7a and 7b are schematic illustrations of a retrofittable carrying handle for a portable computer with a built-in inductive power coil according to further embodiments of the disclosure;

FIG. 8 is a schematic illustration of a fashion-tag attachment with a built-in inductive power coil in accordance with still another embodiment of the disclosure;

FIGS. 9a and 9b are schematic illustrations of a computer provided with another embodiment of the disclosure including a retractable secondary inductive coil attachment;

FIG. 13 is a schematic illustration of an inductive charger of another embodiment of the disclosure having a hermaphrodite power connector;

FIGS. 14a-c are schematic illustrations of a protective case according to a further embodiment of the disclosure with a built-in an inductive charger for a mobile communication device;

FIG. 23b is a schematic representation of a mobile telephone being charged by the inductive coil of FIG. 23a.

DETAILED DESCRIPTION

As those of ordinary skill in the art will understand, various features of the present disclosure as illustrated and described with reference to any one of the Figures may be combined with features illustrated in one or more other Figures to produce embodiments of the present disclosure that are not explicitly illustrated or described. The combinations of features illustrated provide representative embodiments for typical applications. However, various combinations and modifications of the features consistent with the teachings of the present disclosure may be desired for particular applications or implementations.

Figure 1:
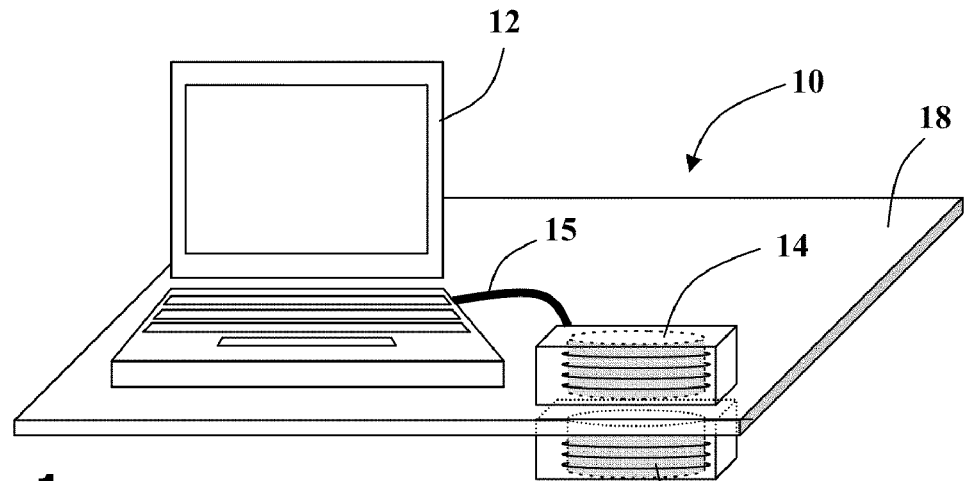
FIG. 1 is a schematic illustration of an inductive power providing means for powering a computer, in accordance with one embodiment of the present disclosure.

Reference is now made to FIG. 1, showing a power providing means 10 for a portable computer 12 consisting of a secondary inductor 14 wired to the portable computer by a connecting wire 15 that is typically a two stripe multi-fiber insulated wire, such as used for providing power to portable computers via a transformer.

The secondary inductor 14 is essentially a coil which can be brought into proximity with a primary inductor 16 which is essentially another coil hardwired to a mains power supply 18. The primary coil 16 and secondary coil 14 thus form an inductive power couple 20, allowing power to be provided to the portable computer 12. The primary coil 16 may be situated in the table top 18 of a conference table, for example. By supplying power inductively in this manner, trailing wires may be avoided, providing a neater, safer and more flexible work environment.

It will be appreciated that, although a system for providing power to a portable computer is described herein, the power providing means 10 may also be applicable to the provision of power to other electrical devices such as a desktop computer, handheld computer, vehicle mounted computer or the like. Power providing means 10 may also be used by other portable systems such as hand-held DVD players, projectors, handheld televisions, digital picture frames or sound systems for example.

Figure 2:
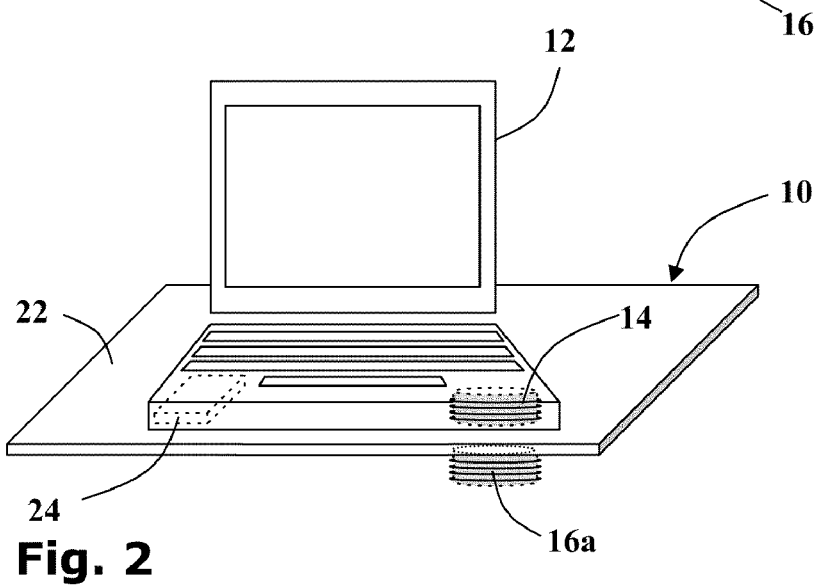
FIG. 2 is a schematic illustration of a computer provided with a secondary inductive coil incorporated within the base thereof, for inductively powering the computer by bringing into proximity with a power supplying inductive coil, according to another embodiment of the disclosure.

As shown in FIG. 2, in an embodiment of the disclosure, the secondary coil 14 may be integral to the portable computer 12, being built into the base thereof, under the keyboard. Positioning the computer 12 over a primary coil 16a in a work-surface 22, for example, enables power to be provided thereto, without trailing wires. The power may be used to recharge the electrochemical power pack (battery) 24 or to power the portable computer 12.

Figure 3:
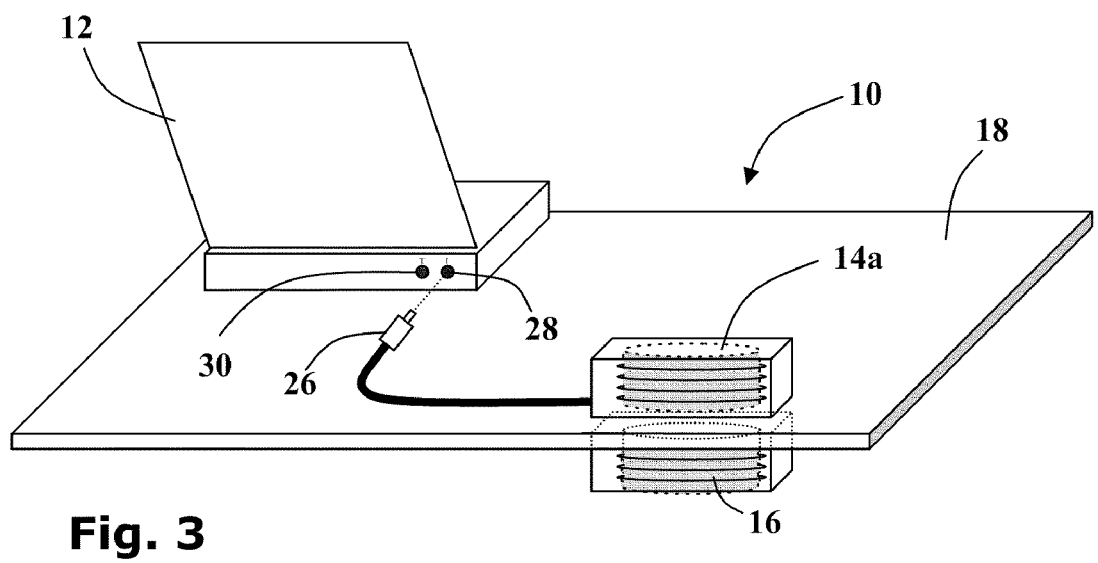
FIG. 3 shows the jack sockets of a portable computer according to a further embodiment of the disclosure for coupling to an electricity mains power source via an inductive couple or via a conventional power supply.

As shown in FIG. 3, in another embodiment of the disclosure, the secondary coil 14a may be coupled to a portable computer 12 designed for optional power provision in this manner, via a jack 26 that is plugged into a dedicated jack socket 28 designed for coupling the secondary coil 14a. The dedicated jack socket 28 is separate from the power supply jack socket 30 supplied for coupling to a power supply (not shown) of the type consisting of a transformer for plugging into a power mains socket that is typically provided. The dedicated jack plug 26 and jack socket 28 may usefully be physically different from power supply jack socket 30 and jack plug (not shown), to prevent misconnection. Similarly, the inductive and transformer sockets 28, 30 may be appropriately labeled, perhaps with letters I and T for inductive and transformer, to prevent confusion.

However, since the purpose of inductive coupling is to avoid and replace transformer coupling, in various embodiments, the secondary coil 14a is connected to the portable computer 12 via the power jack socket 30 designed for coupling to a mains via a power supply of the transformer type. In this manner, existing portable computers may be retrofitted with a secondary coil 14a for inductive powering.

Power may alternatively be provided to the portable computer 12 via connecting points designed for coupling to a rechargeable electrochemical power pack within the housing for the power pack.

The secondary coil 14a may be provided as a sort of puck on a wire that can be positioned over an access point in a surface where a primary coil 16 is provided.

Figure 4:
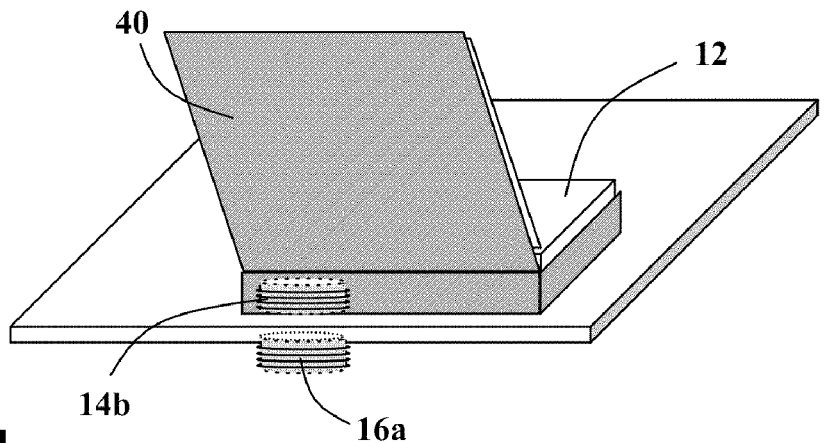
FIG. 4 is a schematic illustration of a computer carrying case according to another embodiment of the disclosure with an inductive power coil built into the base thereof.
Figure 5:
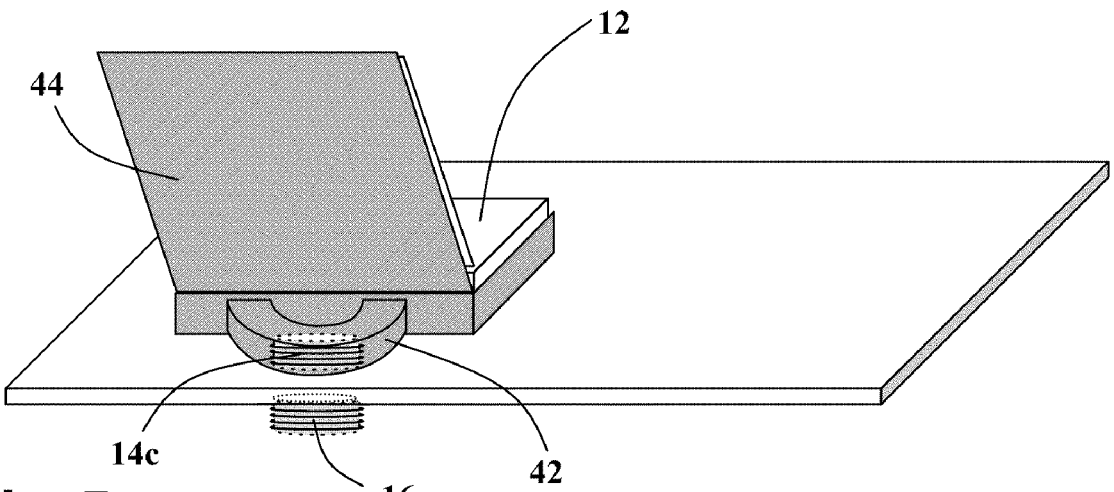
FIG. 5 is a schematic illustration of another embodiment of the computer carrying case having an inductive power coil built into the handle thereof.

Alternatively however, usefully, to provide a neat solution, to eliminate trailing wires, recoiling such wires and to make disconnecting simpler, as shown in FIG. 4 the secondary coil 14b may be incorporated into an accessory that has additional functionality. For example, it may be built into the side of a carrying case 40 or skin provided for carrying the portable computer 12. In one embodiment as shown in FIG. 5 the secondary coil 14c is built into the handle 42 of a carrying case 44.

Figure 6:
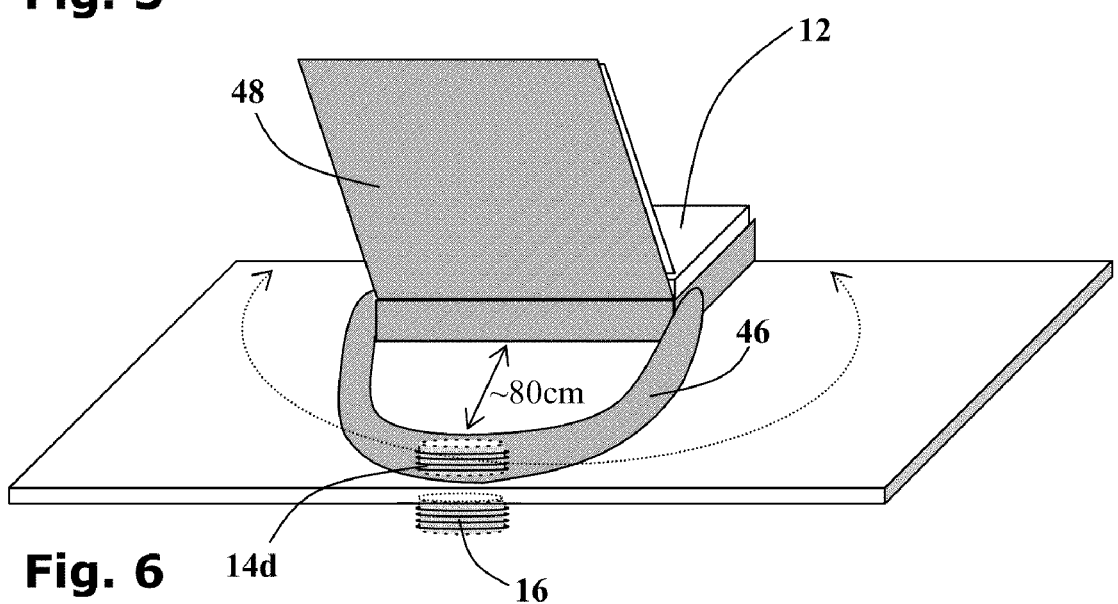
FIG. 6 is a schematic illustration of still another embodiment of the computer carrying case having an inductive power coil built into the shoulder strap thereof.

As shown in FIG. 6, in one embodiment, the secondary coil 14d is built into the shoulder strap 46 of a carrying case 48 which being flexible, gives more flexibility to the user, in that the computer 12 can be left in its case, and situated anywhere within a radius of about 80 cm from a "power-spot" where a primary coil 16 is situated.

With reference now to FIGS. 7a and 7b, a retrofittable carrying handle 52 for a computer 12 is shown. The handle 52 is attached to the computer by straps 54 and incorporates a built-in inductive power coil 14e electrically coupled to the computer via a power plug 56 which plugs into the power jack 30 of the computer 12.

Whilst the computer 12 is being carried, the straps 54 surround and support the computer 12 as shown in FIG. 7b. However, as shown in FIG. 7a, when the computer 12 is laid down and in use, the support straps 54 are opened allowing the inductive power coil 14e to be coupled to a primary coil 16 situated anywhere within their radius.

Alternatively, with reference to FIG. 8, the inductive power coil 14 may be concealed inside a fashion-tag 62 attached to the computer 12 for example by a connecting chain 64 or the like. Thus, by aligning the fashion-tag 62 to a power spot, the computer may draw power from a primary coil 16.

In a further embodiment, a retractable secondary inductive coil attachment 70 may be retrofitted to a portable computer 12, as shown in FIGS. 9a and 9b. The secondary inductive coil 14f is held in a tongue 74 mounted upon the base of the computer 12 and when the computer 12 is in use as shown in FIG. 9a, the tongue 74 may be extended so that the secondary coil 14f may couple with a power spot 16 within its radius.

When the portable computer is stowed, as in FIG. 9b, tongue 74 may be retracted. In one embodiment, the thickness of the secondary inductive coil attachment 70 is less than the height of the feet 13 of the computer 12 so that the attachment 70 does not prevent the computer 12 lying flat along a table top.

Figure 10:
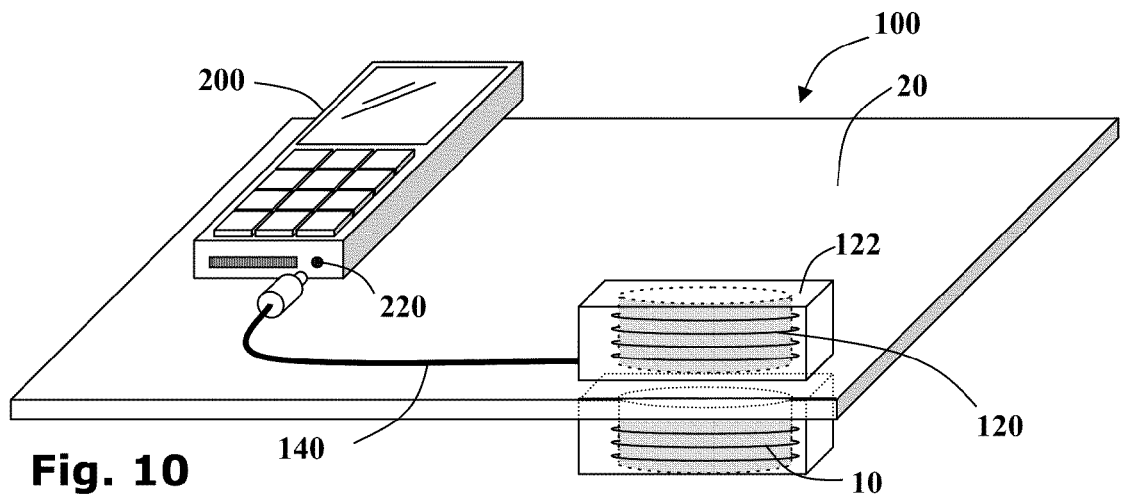
FIG. 10 is a schematic illustration of an inductive charger for a mobile communication device of a further embodiment of the disclosure.

Referring now to FIG. 10, an inductive charger 100 is shown for charging the power cells of a mobile communication device 200 such as mobile telephone, personal digital assistant (PDA), camera or the like, indeed many mobile devices include all of these functions. The charger 100 consists of a secondary coil 120 wired to the mobile communication device 200 typically via a power jack socket 220 of by a connecting wire 140—typically a two stripe multi-fiber insulating wire, such as used for electrically connecting a power source to a mobile communication device via a transformer.

The secondary coil 120 can be brought into proximity with a primary coil 10 hardwired to a mains power supply, to form an inductive power couple, allowing power to be provided to recharge the cells 240 (FIGS. 12a and 12b) of the mobile communication device 200. The primary coil 10 may be situated in the table top 20 of a conference table, for example, thereby allowing a phone 200 to be recharged thereby. By inductively recharging in this manner, trailing wires may be avoided or at least minimized. The secondary coil 120 may be provided for example as a sort of puck 122 on a wire that can be positioned over an access point in a surface where a primary coil 10 is provided. Alternatively the secondary coil 120 may be built into an accessory of the telephone 200.

Over the years, mobile telephones have become a fashion item and various fashionable accessories are often sold for use therewith. Such accessories include for example, replacement phone skins, protective cases, belt clips, small ornamental pendants, sometimes known as "mobile danglers" and the like. Some such accessories are merely decorative, others perform secondary functions such as providing added protection to the device, or more convenient ways to carry the device. The secondary coil 120 of the current disclosure may be incorporated into any of these.

Figures 11A, 11B:
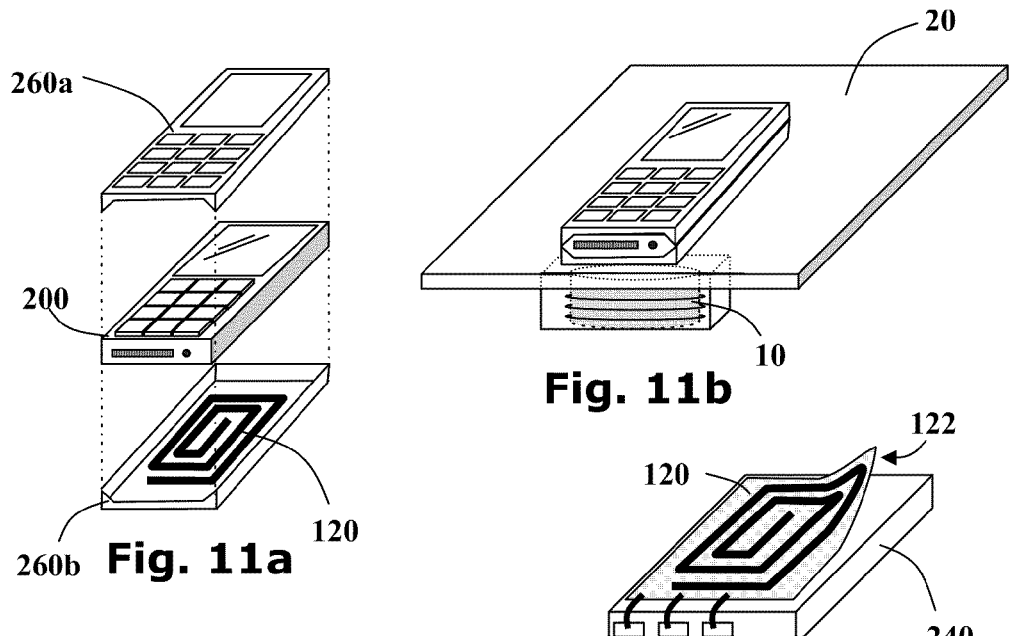
FIGS. 11a and 11b are schematic illustrations of a mobile communication device with an inductive charger built into the skin thereof according to another embodiment of the disclosure.

As shown in FIG. 11a, according an embodiment of the disclosure the secondary coil 120 may be built into the skin or casing 260a, 260b of the mobile communication device. Positioning the mobile communication device over a primary coil 10, as shown in FIG. 11b, at an access point in a work-surface 20, for example, enables power to be provided to the charger thereby charging the power cells 240 of the mobile communication device 200 without trailing wires.

The charger may be connected directly to the terminals of the power cells. Alternatively the charger may be connected to the power cells via the power jack socket 220 of the mobile communication device 200.

Figure 12A:
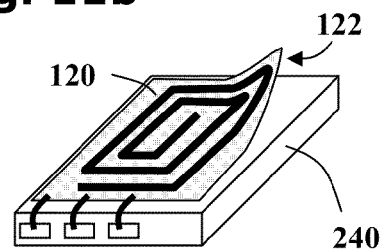
FIG. 12a is a schematic illustration of a self-adhesive inductive charger for a mobile communication device adhered to a power cell according to another embodiment of the disclosure.
Figure 12B:
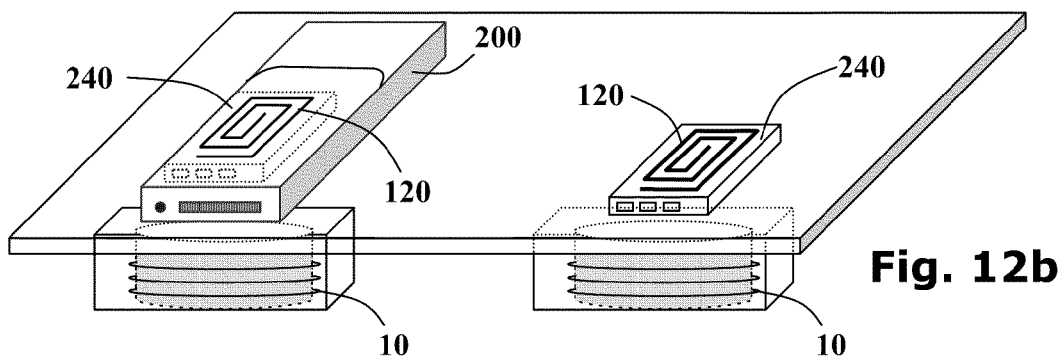
FIG. 12b is a schematic illustration of how the self-adhesive inductive charger of FIG. 12a may be used to charge cells.

According to another embodiment, shown in FIG. 12a, the secondary coil 120 may be provided with an adhesive surface 122 so that the coil 120 may be adhered directly onto the power cells 240 of a mobile telecommunication device 200 in conductive contact with the terminals of the power cells. When power cells 240 are positioned such that the secondary coil 120 forms as inductive couple with a primary coil 10 the cells 240 may be recharged. As shown in FIG. 12b, it is noted that in this embodiment, the cells 240 are recharged directly from the secondary coil 120 so the cells 240 do not need to be connected to the device in order for them to be charged.

Referring now to FIG. 13, in further embodiment, the secondary coil 120 is wired to a hermaphrodite power connector 160 including both a male plug 162 and a female socket 164. The male plug 162 of the hermaphrodite power connector 160 may be coupled to the power jack socket 220 of the device while still providing a female socket 164 for accommodating the plug 40 of a conventional conductive charger. With this embodiment, a user may select between charging the power cells 240 of the mobile communication device 200 using the inductive charger 100 or the conductive type charger. The selection may be facilitated by means of a switch although, in one embodiment, the power connector 160 is configured automatically to select the inductive charger whenever the secondary coil 120 is inductively coupled to a primary coil 10 and to select the conductive power supply whenever the female socket 164 is conductively coupled to a power source.

Alternatively, in the embodiment shown in FIGS. 14a-c, the secondary coil 120 may be built into a protective or fashionable case 300 which may be fitted to a mobile communication device 200. The secondary coil 120 is typically wired to a hermaphrodite power connector 160 within the case 300 which is configured to couple with the power jack socket 220 of the mobile communication device.

Figure 15:
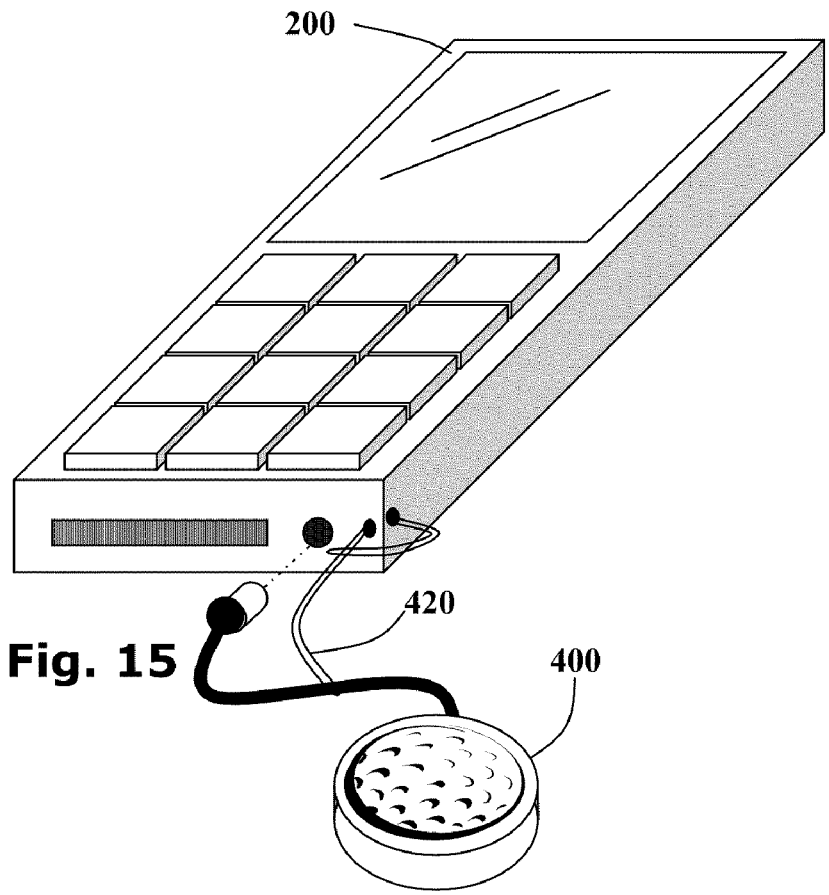
FIG. 15 is a schematic illustration of a mobile communication device with an inductive charger built into a fashion tag.

A further embodiment is illustrated in FIG. 15 showing a mobile communication device 200 having a secondary coil concealed within a fashionable tag 400, such as a so called "mobile dangler" or the like, which may be plugged directly into the power jack socket 220 with additional mechanical support 420 optionally provided. The inductive charger 100 of the disclosure may thus be incorporated within a fashion accessory for the mobile communication device. In a similar manner, the secondary coil 120 may be concealed in other accessories of the mobile telecommunication device such as a belt clip, neck cord, hand strap or the like.

Figure 16:
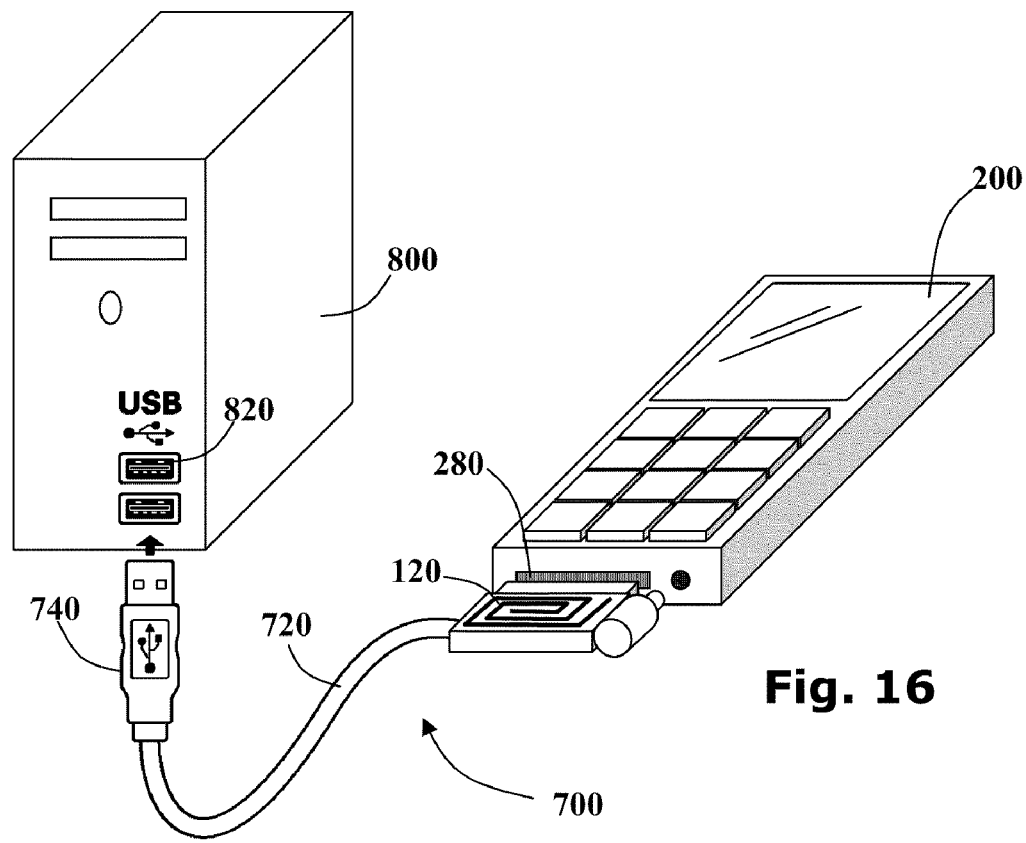
FIG. 16 is a schematic illustration of an inductive charger for a mobile communication device with a combined data connector.

According to still another embodiment, with reference to FIG. 16, an inductive charger 700 has a data channel coupled to the data jack socket 280 of the mobile communication device 200. A USB (Universal Serial Bus) cable 720 leading to a USB plug is wired to the inductive charger which may be connected to USB jack socket 820 of a computer 800, for example, thereby providing a data link between the mobile communication device 200 and the computer 800.

The USB connector 740 may, in addition, draw power from the computer 800 and may thus be used to provide power to charge the power cells 120 of the mobile communication device 200 directly. As described hereinabove with reference to the hermaphrodite connector, the charger 700 may be configured to select automatically between charging the power cells 120 from the USB connector 740 or the secondary coil 120 depending upon the availability of power.

U.S. Pat. No. 7,180,265 to Nokia Corporation, titled "Charging Device with an Induction Coil" describes an inductive charging device for charging portable electronic devices with small footprints. The charger described in '265 includes a battery; a first induction coil coupled to the battery; and an induction core extending through the first induction coil. The induction core has a portion which extends in an outward direction from the charging device and is adapted to removably couple with a second induction coil of a portable electronic device by extending into the second induction coil.

The charger described in '265 is essentially a charging hook upon which electronic devices may be suspended by support loops. The hook is coupled to the first inductive coil and is adapted to charge up the electronic devices via the secondary inductive coils which may be incorporated into the support loops. '265 claims to provide a convenient way to organize devices being charged. However, for some applications the support strap itself is undesirable, and as discussed hereinabove, there is a general desire to limit the number of wires, straps and cables.

Figure 17:
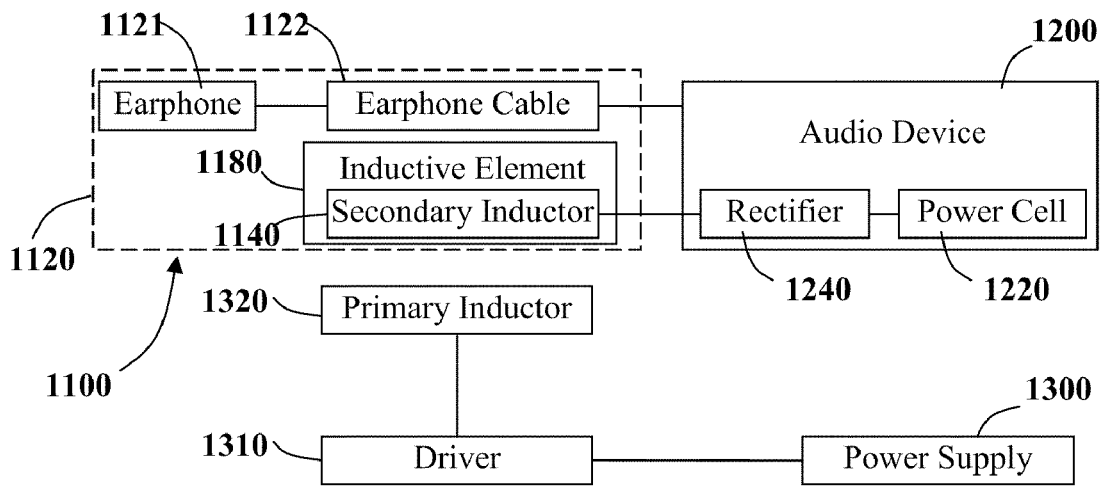
FIG. 17 is a block diagram showing the main elements of a charger for an audio device incorporated into an earphone unit in accordance with another embodiment of the disclosure.

By way of example, referring now to FIG. 17, a block diagram showing the main elements of an inductive charger 1100 for charging the internal power cells 1220 of an audio device 1200, according to an embodiment of the disclosure.

The charger 1100 includes a secondary inductor 1140 wired to the power cells 1220 of the audio device 1200 via a rectifier 1240. An inductive element 1180 is incorporated into the earphone unit 1120 for inductively coupling the secondary inductor 1140 to an external primary inductor 1320.

The primary inductor 1320 is typically wired to a power supply 1300 via a driving unit 1310. The driving unit 1310 provides electronics to drive the primary inductor 1320, such as a switching unit providing a high frequency oscillating voltage supply, for example.

Charger 1100 is suitable for use with audio devices 1200 requiring earphones 1121 connected via earphone cables 1122 such as, telephones, media players, personal digital assistants (PDA), Walkman®s, portable CD players, portable DVD players, mobile communications devices and the like.

It is a particular feature of this embodiment, that at least a part of the inductive charger 1100 is incorporated in the earphone unit 1120 of the audio device 1200. This represents an advantage over prior art devices such as the system described in U.S. Pat. No. 7,164,255 to Hui, which disadvantageously requires a secondary winding to be incorporated either within the device itself or in a dedicated adaptor, whereas the inductive charger 1100 of the present disclosure is suitable for use in charging audio devices with small footprints. Furthermore, because the inductive charger 1100 of the present disclosure is incorporated into the earphone unit 1120, the dimensions of the audio device 1200 itself are not compromised by the addition of peripheral elements such as the support strap described in U.S. Pat. No. 7,180,265 to Nokia Corporation, for example.

Figure 18A:
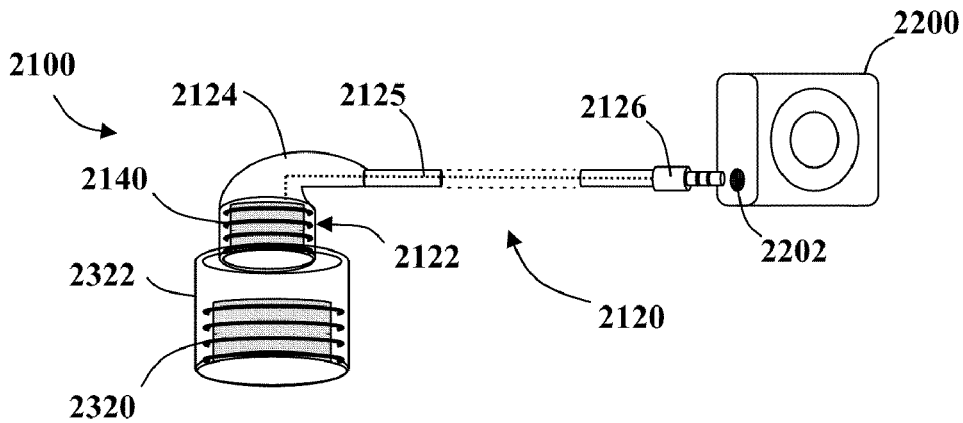
FIG. 18a is a schematic diagram of a charger for an audio device according to another embodiment of the disclosure, wherein the voice coil of a speaker is wired to the power cell of the audio device and is inductively coupleable to a primary inductor.

With reference to FIG. 18a, a schematic diagram of a charger 2100 for an audio device 2200 according to another embodiment is shown. In this embodiment, the earphone unit 2120 includes a moving coil speaker 2122 incorporated within an earpiece 2124 which is connected via a signal line 2125 to a plug 2126 for coupling to the audio device 2200 via an earphone jack 2202. The voice coil 2140 of the moving coil speaker 2122 is a transducer that receives electrical signals from the signal lines 2125 and converts them to audio signals.

The voice coil 2140 is additionally configured to be couplable to an external primary inductor 2320 which may be housed within a docking station 2322. Thus the voice coil 2140 may serve as the secondary inductor 1140 (FIG. 17) of the inductive charger 2100, providing power to the audio device via the signal lines 2125. Alternatively, dedicated power lines within the earphone unit 2120 may provide a conductive connection between the voice coil 2140 and the internal power cell 220 of the audio device 200 via a rectifier 1240 (FIG. 17).

Figure 18B:
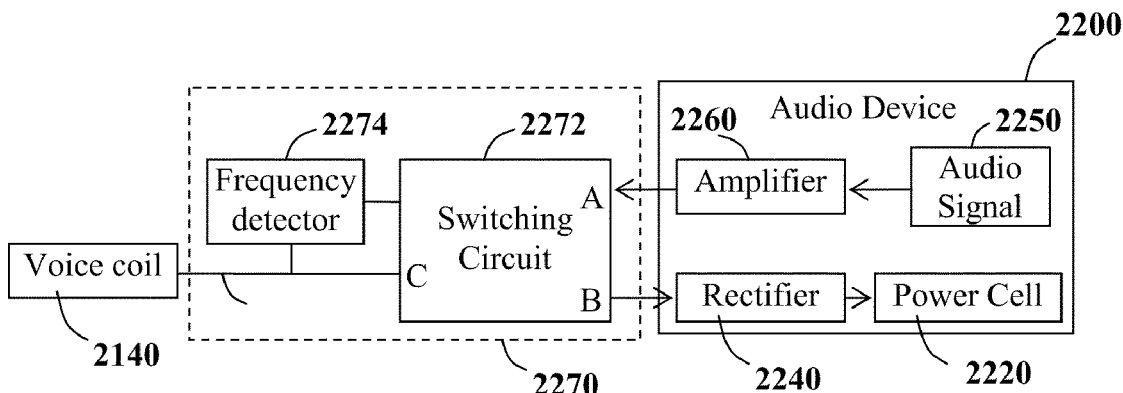
FIG. 18b is a block diagram showing the main elements of a switching unit for connecting the charger of FIG. 18a to an audio device.

FIG. 18b is a block diagram of the main elements of a switching unit 2270 for connecting the charger 2100 of FIG. 18a to an audio device 2200. The switching unit 2270 is provided to selectively connect the voice coil 2140 to the audio device 2200. The switching unit 2270 may be a separate unit that is retrofittable both to the audio device 2200 and to the earphone unit 2120. Alternatively, the switching unit 2270 may be incorporated into either the audio device 2200 or the earphone unit 2120.

The switching unit 2270 may connect the voice coil terminal C to either an audio signal input A or to a charger output B of a switching circuit 2272. The audio signal input A receives an audio signal 2250 from an amplifier 2260 which is communicated to the voice coil 2140. The charger output B is connected to the power cell 2220 via a rectifier 2240 and may be used for charging the power cell 2220 when the voice coil 2140 is coupled to primary inductor 2320.

Optionally the switching circuit 2272 may be controlled by a frequency detector 2274 which is configured and operable to detect high frequency voltage fluctuations along the signal line. High frequency voltage fluctuations are indicative that the voice coil 2140 is coupled to an active primary inductor 2320. Therefore, when such high frequency fluctuations are detected, the switching circuit 2272 may be connected to the charger output B for charging the power cell 2220.

Figure 19A:
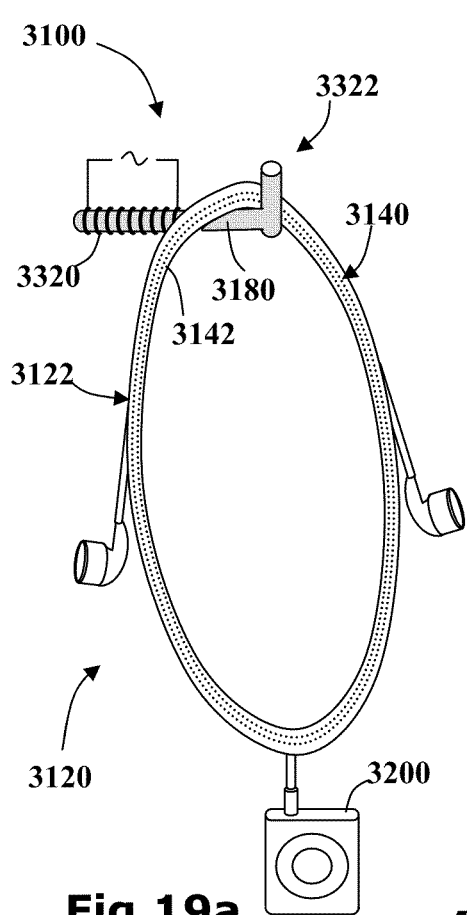
FIG. 19a is a schematic diagram of another embodiment of the charger for an audio device wherein an induction loop is incorporated into a neck support of the earphone unit.
Figure 19B:
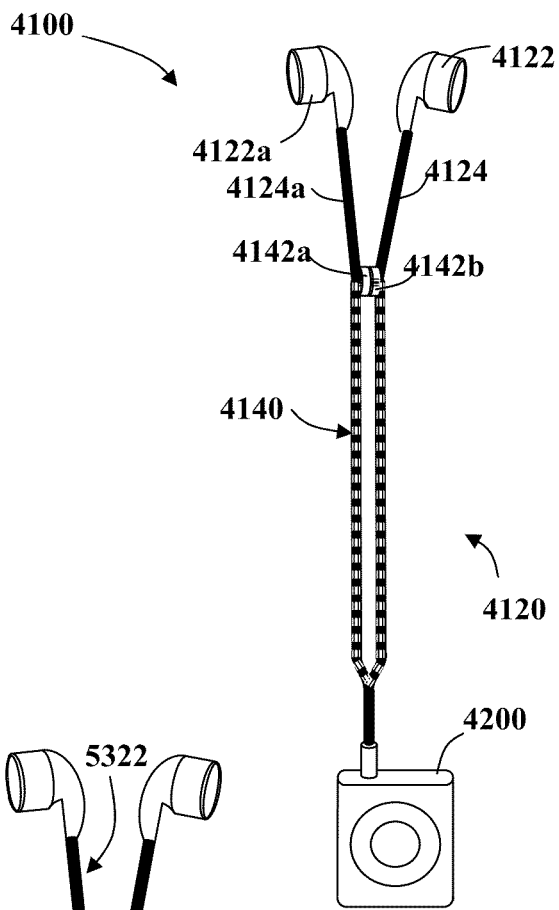
FIG. 19b is a schematic diagram of still another embodiment of the charger for an audio device wherein an induction loop is formed by connecting contact-terminals incorporated into the earphone cables.
Figure 19C:
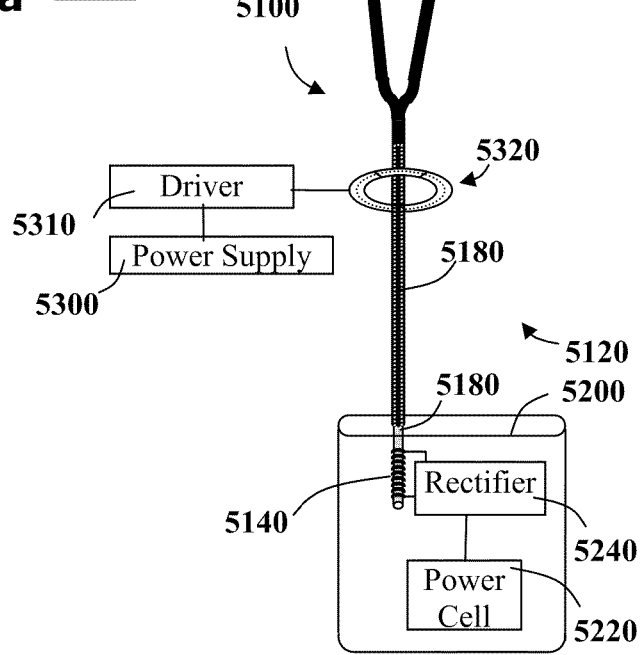
FIG. 19c is a schematic representation of an embodiment of the charger for an audio device wherein an inductive core extends through an internal secondary coil and into the earphone unit for coupling with an external primary inductor.

FIGS. 19a-c are schematic diagrams showing various embodiments of charger 3100, 4100, 5100 for an audio device 3200, 4200, 5200. With reference to FIG. 19a, the earphone unit 3120 includes a neck support 3122. Within the neck support 3122 is an induction loop 3140 of conductive wire 3142 that is wound into a coil and connected to the internal power cell 1220 (FIG. 17) of the audio device 3200 via a rectifier 1240 (FIG. 17). The inductive loop 3140 is configured to inductively couple with an external primary inductor 320. The audio device 3200 may be conveniently stored by suspending the neck support 3122 from a hook 3322.

In various embodiments, the hook 3322 is fabricated from a ferromagnetic material which extends through a primary coil 3320. When the neck support 3122 is suspended from the hook 3322, the ferromagnetic material forms a common inductive core 3180 between the primary coil 3320 and the inductive loop 3140 within the neck support 3122. The primary coil 3320 and inductive loop 3140 thus form an inductive couple such that power may be inductively transferred from the primary coil 3320 to the inductive loop 3140, thereby charging the power cells 1220 (FIG. 17) of the audio device 3200.

Optionally, the inductive couple may be improved by the inclusion of a ferromagnetic element (not shown) and may be incorporated into the neck support 3122 and configured so as to couple with the ferromagnetic inductive core 3180 of the hook 3322 so as to complete a magnetic circuit.

Although the example of an inductive loop 3140 within a neck support 3122 is described herein, it is noted that a secondary inductor may be housed in various other components of an earphone unit. For example a secondary induction coil may be housed in a dedicated unit within the earphone cable. Alternatively a secondary coil may be incorporated into a microphone housing such as is commonly included in the earphone cable of a cellular telephone. Alternatively again a secondary coil may be incorporated into a cable stowage unit such as a spring loaded winder as is sometimes included with earphone units for convenient storage.

An alternative embodiment of the induction loop is schematically represented in FIG. 19b, wherein a charger 4100 for an audio device 4200 according to another embodiment of the current disclosure is shown. The earphone unit 4120 of this embodiment includes two earpieces 4122a, 4122b, each connected to the audio device 4200 via its own earphone cable 4124a, 4124b. A bundle of induction wires 4140, embedded in the earphone cables 4124, is connected to the internal power cell 1220 (FIG. 17) of the audio device 4200 via the rectifier 1240 (FIG. 17). Contact-terminals 4142a and 4142b at each end of the bundle of induction wires 4140, typically located near the earpieces 4122*a*, 4122*b*, are configured to conductively couple the ends of the bundle of induction wires 4140 thereby forming an induction loop. The induction loop may be coupled with an external primary coil (not shown) such that power may be inductively transferred from the primary coil to the inductive loop.

FIG. 19*c* is a schematic representation of a charger 5100 for an audio device 5200 according to still another embodiment of the disclosure. The audio device 5200 incorporates an internal secondary coil 5140 connected to the internal power cell 5220 via the rectifier 5240. An inductive core 5180 extends through the internal secondary coil 5140 and into the earphone unit 5120 for coupling with a primary inductor 5320. The primary inductor may, for example, be incorporated into a hook (not shown) for suspending the audio device 5200.

Figure 20:
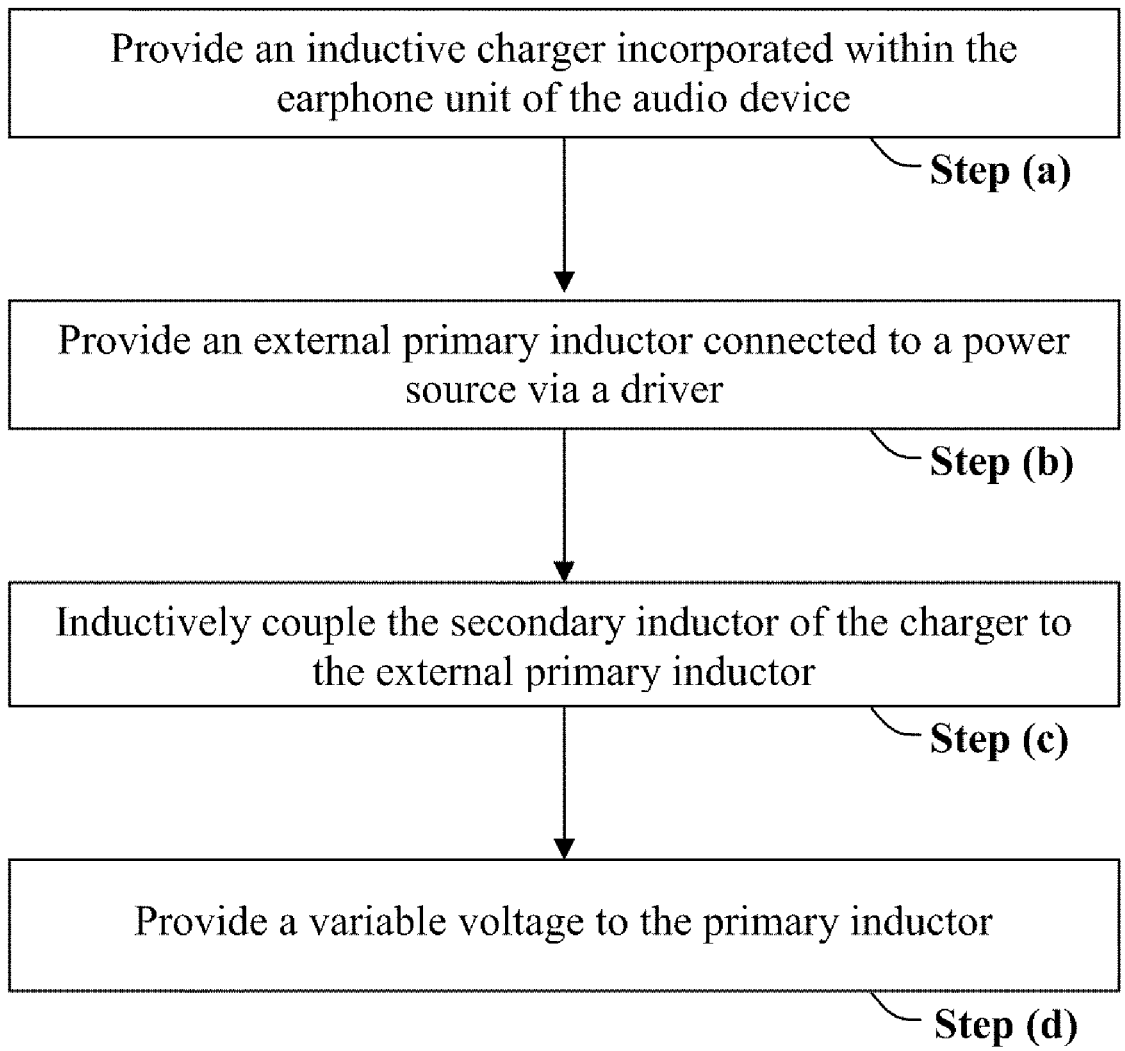
FIG. 20 is a flowchart showing a possible method for charging the internal power cell of an audio device.

FIG. 20 is a flowchart showing a method for inductively charging the internal power cell of an audio device in accordance with one embodiment of the disclosure. The method comprises the steps of:

- step (a) providing an inductive charger incorporated within the earphone unit of the audio device, including a secondary inductor connected to the power cell via a rectifier;
- step (b) providing an external primary inductor connected to a power source via a driver;
- step (c) inductively coupling the secondary inductor of the charger to the external primary inductor, and
- step (d) providing a variable voltage to the primary inductor.

Figure 21A:
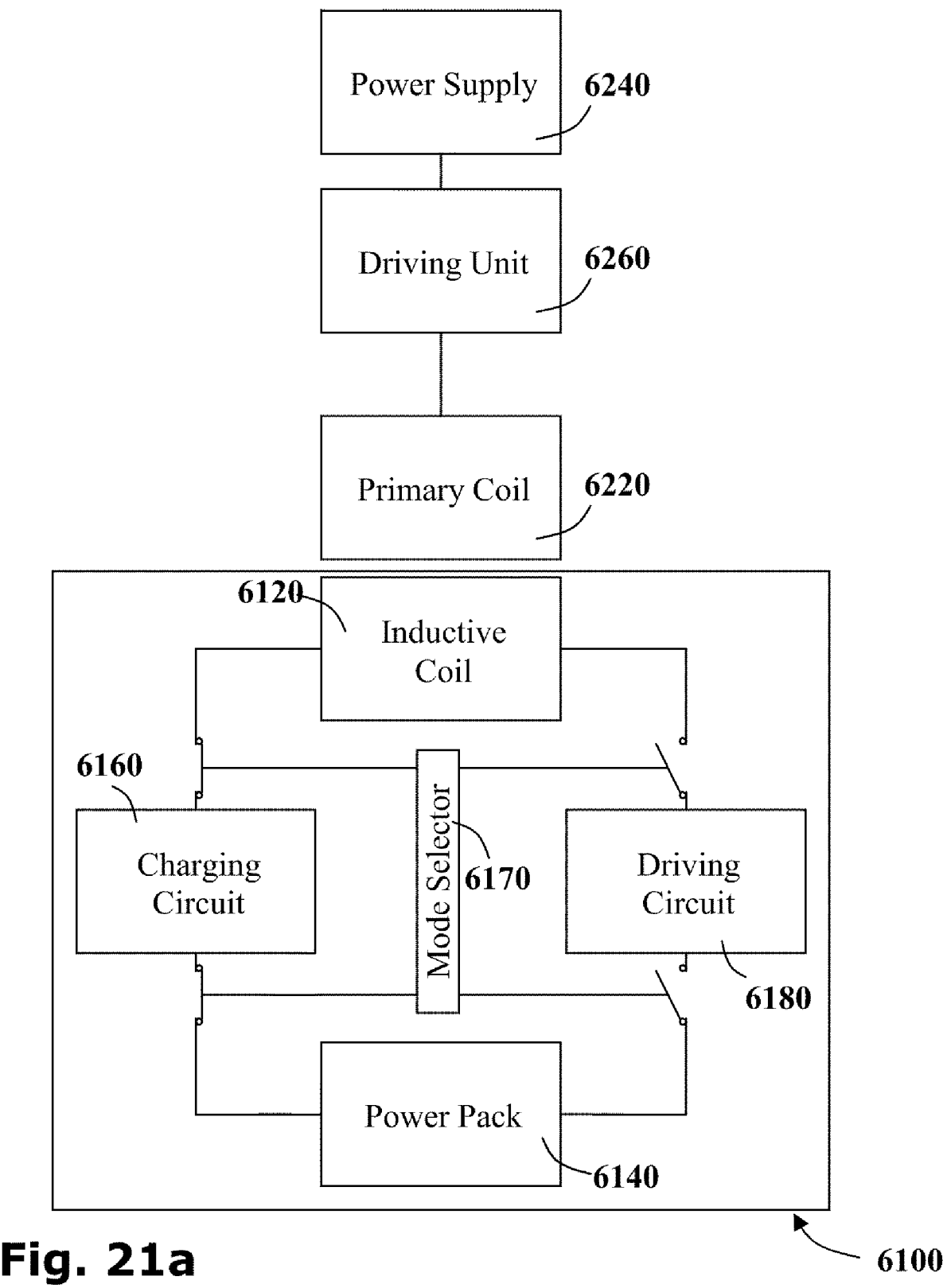
FIGS. 21a and 21b are block diagrams schematically representing an inductive charger according a further embodiment of the disclosure in charging and driving modes respectively.
Figure 21B:
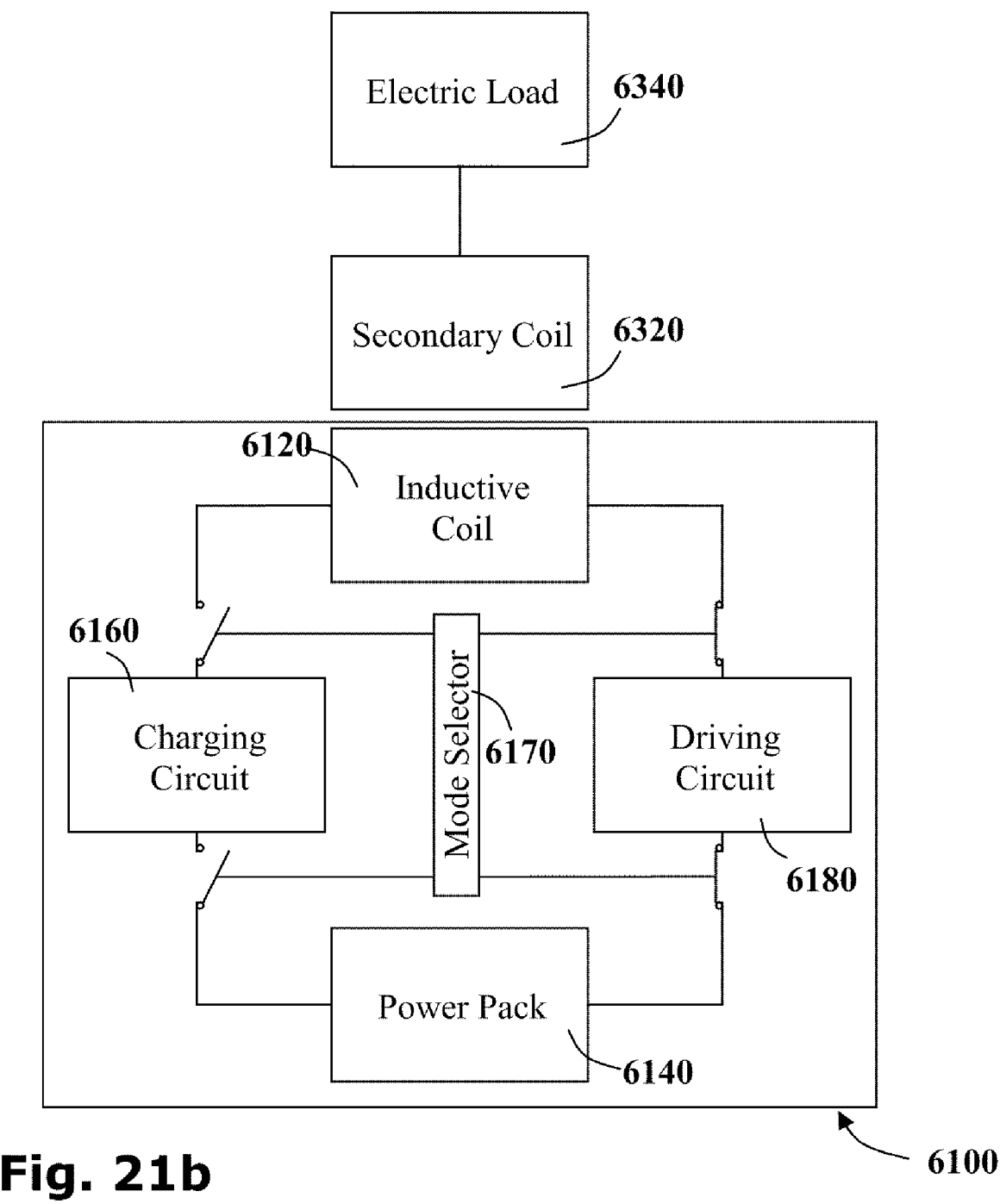

Reference is now made to FIGS. 21*a* and 21*b* which are block diagrams schematically representing the inductive charger 6100 for use with another embodiment of the disclosure. The inductive charger 6100 consists of an inductive coil 6120 and a chargeable power pack 6140 which can be connected to each other via a charging circuit 6160 or alternatively via a driving circuit 6180. It is a particular feature of the current disclosure that the inductive charger 6100 may be switched between two modes: (a) a charging mode as shown in FIG. 21*a*, and (b) a driving mode, as shown in FIG. 21*b*. A mode selector 6170 is used to select between the two modes.

With particular reference to FIG. 21*a*, representing the inductive charger 6100 in charging mode, the inductive coil 6120 is coupled to an external primary inductive coil 6220 which is connected to a power supply 6240 via a driving unit 6260. The mode selector 6170 is configured to connect the inductive coil 6120 to the power pack 6140 via the charging circuit 6160.

In the charging mode, the external primary coil 6220 generates an oscillating magnetic field. The internal inductive coil 6120 is placed in the vicinity of the external primary coil 6220, thereby creating a magnetic flux linkage between the primary coil 6220 and the internal inductive coil 6120, by which power is transferred from the external primary coil 6220 to the internal inductive coil 6120. Typically, direct current is used to reverse the electrochemical reactions that result in power supply from the power packs and the charging circuit 6160 rectifies the alternating current generated in the inductive coil 6120 thereby allowing the power pack 6140 to be recharged.

Referring now to FIG. 21*b*, representing the inductive charger 6100 in driving mode, where the inductive coil 6120 is inductively coupled to an external secondary inductive coil 6320 which is wired to an electric load 6340. The mode selector 6170 is configured to connect the inductive coil 6120 to the power pack 6140 via the driving circuit 6180. In the driving mode the power supply 6140 provides power to the driver circuit 6180 which provides a varying electrical potential to drive the inductive coil 6120. The driver circuit 6180 typically includes a high frequency switching unit intermittently connecting the power pack 6140 to the inductive coil 6120. The varying electrical potential across the inductive coil 6120 produces an oscillating magnetic field. Therefore, an external secondary coil 6320 which is brought into the vicinity of the inductive charger 6100 may inductively couple with the inductive coil 6120. An electric load 6340 wired to the secondary coil 6320 may thereby draw power from the power pack 6140.

Many examples of rechargeable power packs are known and may be suitable for use with various embodiments of the inductive charger 6100. Examples of rechargeable electrochemical cells include nickel-cadmium cells, nickel metal hydride cells, alkaline cells, flow batteries and the like. Other power storage devices such as lead alkali accumulators, capacitors and supercapacitors may also be charged by the inductive charger 6100.

Figure 22A:
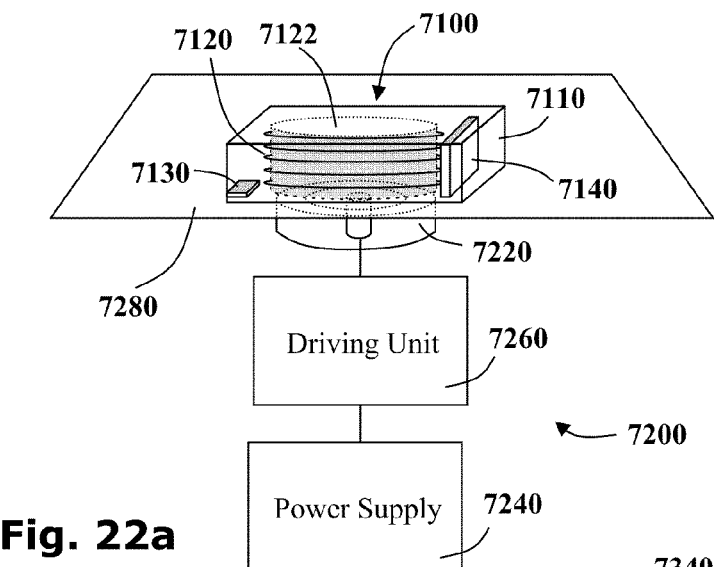
FIG. 22a is a schematic representation of another embodiment of the inductive charger being charged by a primary coil.
Figure 22B:
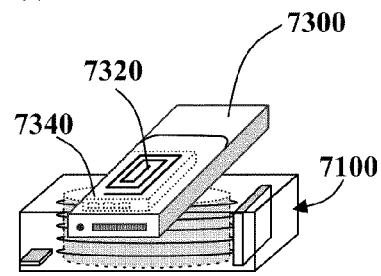
FIG. 22b is a schematic representation of the inductive charger of FIG. 22a being used to charge a mobile telephone wired to a secondary coil.

Reference is now made to FIGS. 22*a* and 22*b* showing an exemplary inductive charger 7100 according to another embodiment of the disclosure. A housing 7110 contains an inductive coil 7120 which is wrapped around a ferromagnetic core 7122 and is connected to an internal power pack 7140 via a control box 7130. The control box 7130 contains driving circuitry for the driving mode, charging circuitry for the charging mode and a mode selector (not shown). In alternative embodiments (not shown), additional circuitry may be provided for charging the power pack 7140 from the mains or other external power source, such as solar power or the like, via a dedicated jack. A dedicated jack may also be provided for conductively connecting with and the powering of an external electrical load.

FIG. 22*a* shows the inductive charger 7100 being charged up by an inductive power outlet 7200 which consists of a primary coil 7220 concealed behind a facing layer, such as Formica or wood veneer, of a platform 7280 such as a desktop, a kitchen work-top, a conference table or a work bench for example. The primary coil 7220 is wired to a power supply 7240 via a driving unit 7260 providing the electronics to drive the primary coil 7120. Driving electronics may include a switching unit providing a high frequency oscillating voltage supply, for example.

As inductive power outlets 7200 become more widespread, it is considered likely that devices may be hardwired to secondary coils, to draw their power inductively therefrom. In particular, mobile phones, media players and the like which are generally connected to external chargers via connecting wires may be provided with internal charging circuitry that includes a secondary coil for inductively coupling to inductive power outlet 7200.

FIG. 22*b* shows a mobile phone 7300 which has an integral secondary inductive coil 7320 connected to its internal power source 7340 via a rectifier (not shown). The mobile phone 7300 may be charged by placing it over an inductive power outlet 7200 such as shown in FIG. 22*a*, thereby inductively coupling the secondary coil 7320 of the device with the primary coil of the outlet 7200.

Where no inductive power outlet 7200 is available, the mobile phone may be charged by placing it on top of the inductive charger 7100, as shown in FIG. 7*b*. With the inductive charger 7100 set to driving mode, the mobile phones secondary coil 7320 inductively couples with the internal inductive coil 7120 of the inductive charger 7100 and draws power therefrom.

Figure 23A:
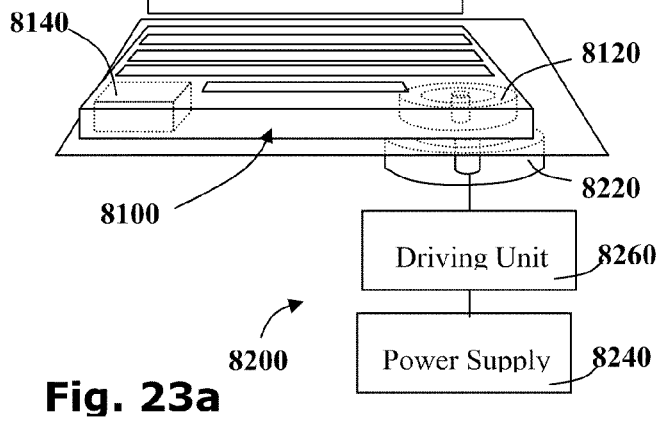
FIG. 23a is a schematic representation of a mobile computer being powered by a primary coil via an integral inductive coil according to another embodiment of the disclosure.
Figure 23B:
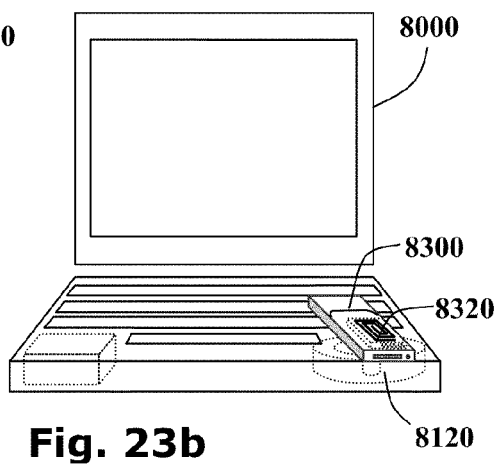

According to another embodiment of the inductive charger, shown in FIGS. 23a and 23b, the inductive charger 8100 is incorporated into a mobile computer 8000. The mobile computer 8000 has a built-in inductive coil 8120 for powering the computer from an inductive power outlet 8200, as shown in FIG. 23a. Once coupled to a primary coil 8220, the inductive coil 8120 may power the computer and/or charge the internal power pack 8140 of the mobile computer.

The inductive coil 8120 of the computer 8000 may additionally be used to charge an external device such as a mobile phone 8300 with an in-built secondary coil 8320, as shown in FIG. 8b. A similar use is already made of computers 8000 to charge external devices such as media players, mobile phones, mice, Bluetooth devices and the like, generally using dedicated cables and via standard ports, such as their USB (universal serial bus) ports. One advantage of this is that no such dedicated cables are needed.

It is noted that, apart from the mobile computer 8000 described herein, inductive chargers may be incorporated into other hosts, such as electric cars, generators, emergency lights or the like for charging electrical devices thereby.

The scope of the present disclosure is defined by the appended claims and includes both combinations and sub combinations of the various features described hereinabove as well as variations and modifications thereof, which would occur to persons skilled in the art upon reading the foregoing description. While the best mode has been described in detail, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments discussed herein that are described as less desirable than other embodiments or prior art implementations with respect to one or more characteristics are not outside the scope of the disclosure and may be desirable for particular applications.

In the claims, the word "comprise", and variations thereof such as "comprises", "comprising" and the like indicate that the components listed are included, but not generally to the exclusion of other components.

The invention claimed is:

1. A power providing system for an electrical device comprising: a secondary inductor, wired to said electrical device, for inductively coupling with a primary inductor hardwired to a power supply, wherein said secondary inductor is incorporated into an accessory of said electrical device; and
   wherein said secondary inductor comprises an electrical connector for coupling to a power jack socket such that said secondary inductor is retrofittable to said electrical device.

2. The power providing system of claim 1 wherein said electrical device is selected from a group consisting of: computers, mobile telephones, media players, PDAs, Walkman®s, portable CD players, dictaphones, portable DVD players and mobile communications devices.

3. The power providing system of claim 1 said electrical connector being a hermaphrodite connector comprising: a male plug portion, for coupling with said power jack socket and a female socket portion for coupling to an external power source.

4. The power providing system of claim 1, wherein said electrical device comprises a removable power pack; said power pack being connectable to said electrical device via contacts, said secondary inductor comprising an electrical connector for coupling to said contacts.

5. The power providing system of claim 1, said electrical device further comprising an electrochemical cell, wherein said secondary inductor is connected to said electrochemical cell via a rectifier for charging said electrochemical cell.

6. The power providing system of claim 1 wherein said accessory is selected from a group consisting of: removable casings of said electrical device, carrying cases for transporting said electrical device, straps for carrying said electrical device, carrying handles, fashion-tags, ornamental pendants, mobile danglers, skins for encasing said electrical device, stickers for adhering to said electrical device, belt-clips, neck support straps and earphone units.

7. The power providing system of claim 1 said electrical device further comprising an electrochemical cell, wherein said accessory comprises a USB plug for coupling to a computer such that said electrochemical cell is selectably chargeable by power drawn from said computer.

8. The power providing system of claim 7 wherein said USB plug is wired to a data jack socket of said electrical device such that data is exchangeable between said computer and said mobile communication device.

9. The power providing system of claim 1 wherein said secondary inductor comprises at least one inductive coil, said at least one inductive coil being selectively connectable to:
   a. at least one charging circuit for connecting said at least one inductive coil to a power pack via a rectifier for charging said power pack when said secondary inductor is inductively coupled to said primary inductor; and
   b. at least one driving circuit connectable to said power pack for providing a varying electrical potential to said at least one inductive coil such that said at least one inductive coil transfers power to an external inductor wired to an external electrical load.

10. The power providing system of claim 9 wherein said power pack is selected from a group consisting of: nickel-cadmium cells, nickel metal hydride cells, alkaline cells, flow batteries, rechargeable electrochemical cells and capacitors.

11. The power providing system of claim 9 additionally comprising a ferromagnetic core for guiding magnetic flux through said inductive coil when inductively coupled.

12. The power providing system of claim 9 wherein said driver comprises at least one switching unit for intermittently connecting said power pack to said inductive coil at high frequency.

13. The power providing system of claim 9 additionally comprising a jack for conductively connecting said power pack to an external power source for charging purposes.

14. The power providing system of claim 9 additionally comprising a jack for conductively connecting said power pack to said external electrical load.

15. A computer comprising the inductive coil of claim 9.

16. The computer of claim 15, wherein said power pack powers said computer.

* * * * *